United States Patent
Knoblauch et al.

(10) Patent No.: US 10,630,147 B2
(45) Date of Patent: Apr. 21, 2020

(54) ELECTRIC MACHINE HAVING A ROTOR SHAFT WITH A DUCT SYSTEM FOR COOLING

(71) Applicant: Dr. Ing. h.c. F. Porsche Aktiengesellschaft, Stuttgart (DE)

(72) Inventors: Daniel Knoblauch, Ludwigsburg (DE); Sebastian Wachter, Weissach (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 0 days.

(21) Appl. No.: 15/987,021

(22) Filed: May 23, 2018

(65) Prior Publication Data
US 2018/0351434 A1 Dec. 6, 2018

(30) Foreign Application Priority Data
Jun. 6, 2017 (DE) .......................... 10 2017 112 348

(51) Int. Cl.
*H02K 9/19* (2006.01)
*H02K 9/193* (2006.01)
(Continued)

(52) U.S. Cl.
CPC .............. *H02K 9/193* (2013.01); *H02K 1/32* (2013.01); *H02K 7/116* (2013.01); *H02K 9/19* (2013.01)

(58) Field of Classification Search
CPC .. H02K 1/32; H02K 5/22; H02K 9/19; H02K 9/193
(Continued)

(56) References Cited

U.S. PATENT DOCUMENTS

2013/0038151 A1* 2/2013 Ohashi ..................... H02K 1/32
310/59
2015/0280525 A1* 10/2015 Rippel ..................... H02K 9/19
310/54
(Continued)

FOREIGN PATENT DOCUMENTS

DE 102013020332 A1 7/2014
EP 0660492 A1 6/1995
(Continued)

OTHER PUBLICATIONS

German Search Report for German Application No. 10 2017 112 348.2, dated Mar. 7, 2018, with partial English translation, 9 pages.
(Continued)

*Primary Examiner* — Alfonso Perez Borroto
*Assistant Examiner* — Rashad H Johnson
(74) *Attorney, Agent, or Firm* — RatnerPrestia

(57) ABSTRACT

An electric machine, in particular for an electric vehicle. The machine includes a rotor which can be rotated with respect to a stator and has at least one rotor shaft. The machine includes a duct system for cooling the machine, through which duct system a coolant can flow. The duct system runs at least in sections within the rotor shaft. Here, the duct system includes a cooling duct. The cooling duct is configured so as to run conically at least in sections in the longitudinal direction of the rotor shaft, such that the coolant can be conveyed in the direction of an increasing duct diameter by way of a rotational movement of the rotor shaft.

13 Claims, 2 Drawing Sheets

(51) Int. Cl.
*H02K 1/32* (2006.01)
*H02K 7/116* (2006.01)

(58) Field of Classification Search
USPC .................................. 310/54, 57, 58, 64, 89
See application file for complete search history.

(56) References Cited

U.S. PATENT DOCUMENTS

2016/0226327 A1* 8/2016 Rippel .................. H02K 1/20
2016/0261158 A1* 9/2016 Horii ..................... H02K 1/32
2017/0207683 A1* 7/2017 Anghel ................. H02K 9/197
2018/0006533 A1* 1/2018 Pal ........................ H02K 9/19

FOREIGN PATENT DOCUMENTS

JP     09154257 A    6/1997
JP   2015091108 A    5/2015

OTHER PUBLICATIONS

Chinese Office Action for Chinese Application No. 201810564101. X, dated Nov. 5, 2019, 7 pages.

* cited by examiner

ELECTRIC MACHINE HAVING A ROTOR SHAFT WITH A DUCT SYSTEM FOR COOLING

CROSS-REFERENCE TO RELATED APPLICATION

This application claims priority to German Patent Application No. DE 10 2017 112 348.2, filed Jun. 6, 2017, which is incorporated by reference herein in its entirety.

FIELD OF THE INVENTION

The present invention relates to an electric machine which is provided, in particular, for an electric vehicle. The machine comprises at least one rotor which can be rotated with respect to at least one stator and has at least one rotor shaft. The electric machine has at least one duct system for cooling the machine, through which duct system a coolant can flow and which duct system runs at least in sections within the rotor shaft.

BACKGROUND OF THE INVENTION

The electric machines which are configured as traction motors in electric vehicles are as a rule heated to a very pronounced extent during operation. Here, the maximum permissible heating has a considerable influence on the performance limit of the electric machine.

Liquid cooling is therefore frequently used. Here, the rotors are usually cooled with water, since water can absorb and discharge the heat particularly satisfactorily. It is disadvantageous, however, that the rotor often has to be sealed in a very complicated manner, since the water is as a rule pumped through the rotor shaft under pressure. In addition, the seal usually causes a very great power loss and frequently also requires a large amount of installation space.

The use of transmission oil as coolant has therefore been disclosed in the prior art. For example, EP 0 660 492 B1, which is incorporated by reference herein, describes an electric machine having a rotor which is cooled by way of transmission oil. The transmission oil is pumped into a central bore of the rotor shaft through a pipe which is adjoined by a pump. The oil flows back into the gearbox again through an oil outlet opening which is configured in the rotor shaft.

It is a disadvantage of cooling of this type, however; that the transmission oil as a rule experiences pronounced ageing above 120° C. In electric machines and, in particular; in traction motors of electric vehicles, however, the rotor shaft can experience temperatures of 160° C. or more. The transmission oil can therefore deteriorate in a particularly pronounced and/or rapid manner in the case of cooling of this type.

SUMMARY OF THE INVENTION

It is therefore the object of the present invention to improve the cooling of an electric machine and preferably of a rotor of an electric machine.

Said object is achieved by way of an electric machine in particular for an electric vehicle, having at least one rotor which can be rotated with respect to at least one stator and has at least one rotor shaft, and having at least one duct system for cooling the machine, through which duct system a coolant can flow, the duct system running at least in sections within the rotor shaft, wherein the duct system comprises at least one cooling duct, and the cooling duct is configured so as to run conically at least in sections in the longitudinal direction of the rotor shaft, with the result that the coolant can be conveyed in the direction of an increasing duct diameter by way of a rotational movement of the rotor shaft. And by way of an electric vehicle having such an electric machine. Preferred developments are the subject matter of the subclaims. Further advantages and features of the present invention result from the general description and the description of the exemplary embodiments.

The electric machine according to aspects of the invention is provided, in particular; for an electric vehicle. The machine comprises at least one rotor which can be rotated with respect to at least one stator. The rotor comprises at least one rotor shaft. The machine comprises at least one duct system which can be flowed through by a coolant in order to cool the machine. The duct system runs at least in sections within the rotor shaft. Here, the duct system comprises at least one cooling duct. The cooling duct is configured so as to run conically at least in sections in the longitudinal direction of the rotor shaft, with the result that the coolant can be conveyed in the direction of an increasing duct diameter by way of a rotational movement of the rotor shaft.

The machine according to aspects of the invention affords many advantages. It is one considerable advantage that the cooling duct has a conical profile. As a result, the coolant can be conveyed actively by way of the rotor shaft. This has the advantage that heated coolant can be discharged and/or cooler coolant can be replenished. Particularly effective cooling of the machine and, in particular, of the rotor is achieved as a result. Conveying of this type of the coolant has the advantage, in addition, that excessive heating of the coolant in the rotor shaft an be counteracted particularly effectively.

Therefore, for example, transmission oil can be used as coolant in the case of the machine according to aspects of the invention, without it being necessary to accept unfavorable and particularly rapid ageing of the oil. The structural complexity of rotor cooling using an oil as coolant is considerably lower in comparison with rotor cooling using water.

The cooling duct is preferably configured as at least one recess which is machined into the rotor shaft. In particular, the recess which is machined into the rotor shaft runs conically. The rotor shaft preferably provides at least one wall of the cooling duct. The rotor shaft and the cooling duct are preferably configured in one piece. As a result, the heat of the rotor can be discharged particularly satisfactorily by way of the coolant which flows in the cooling duct.

The cooling duct is configured, for example, as a conical through hole in the rotor shaft. Here, at least one end of the through hole is preferably closed at least partially. For example, a cover and/or plug can be provided to this end. It is also possible that one end of the through hole is closed by way of at least one joined shaft end and/or by way of at least one shaft stub. Here, at least one inlet duct and/or at least one outlet duct can be provided for the coolant at the closed end.

It is also possible that the cooling duct is, configured as a conical blind bore in the rotor shaft. Here, the open end of the blind bore can be at least partially closed. The closed end and/or the open or closed end of the blind bore can be equipped with at least one inlet duct and/or with at least one outlet duct.

It is also possible that the cooling duct is provided by way of at least one conical duct component which is arranged in the rotor shaft. For example, a conical sleeve or the like can be arranged in a cavity of the rotor shaft.

The rotor shaft comprises, in particular, at least one inlet for introducing the coolant into the cooling duct. The rotor shaft comprises, in particular, at least one outlet for discharging the coolant from the cooling duct. The inlet and the outlet are preferably arranged on a common end section of the rotor shaft. As a result, the feed and discharge of the coolant can take place in a particularly compact manner and, in particular, without long reed lines.

The inlet and/or the outlet can be arranged axially and/or radially, on the end section of the rotor shaft. The inlet and the outlet are particularly preferably arranged at an output-side shaft end of the rotor shaft. The inlet and/or outlet can comprise at least one inlet duct and outlet duct, respectively, or can be configured as a duct of this type.

It is also possible, however, that the inlet and the outlet are arranged on opposite end sections of the rotor shaft. The inlet and the outlet can also be arranged jointly at a shaft end which is not provided for output purposes.

The inlet and/or the outlet are/is preferably flow-connected to at least one conveying device for the coolant. The conveying device comprises, in particular, at least one pump. The conveying device is provided, in particular, to convey the coolant actively. The conveying device is configured, in particular, to convey a transmission oil of a transmission which can be coupled to the machine. The conveying device can comprise at least one storage vessel for the coolant and, in particular, for the transmission oil. An interior or oil space of a transmission, through which oil is flushed, can also serve as a storage vessel. The inlet and/or the outlet are/is preferably flow-connected to at least one oil space of a transmission which is coupled to the machine.

The inlet is connected, in particular, to at least one line element. In particular, the line element runs at least in sections within the cooling duct. In particular, the line element opens into the cooling duct at a duct end which lies opposite the inlet. A line element of this type provides a reliable and uncomplicated possibility for moving coolant from the inlet to an end of the cooling duct which lies opposite the inlet. From there, the coolant can be conveyed back to the outlet by way of the rotational movement of the rotor shaft.

In particular, the duct end which lies opposite the inlet has a smaller internal diameter than the duct end with the inlet and/or outlet. In particular, the line element extends from a duct end with a greater internal diameter to a duct end with a smaller internal diameter.

In particular, the line element opens in a half of the cooling duct, which half lies opposite the inlet. In particular, the line element opens in a third, which lies opposite the inlet, and preferably a quarter and particularly preferably an eighth of the cooling duct. In particular, the line element extends over more than half and preferably over more than three quarters and particularly preferably over more than 90% of the length of the cooling duct.

In one preferred refinement, the line element runs at least in sections outside the cooling duct. In particular, the line element can be coupled to at least one conveying device of the coolant. Here, the line element is preferably configured as a hollow or tubular lance. This makes a particularly uncomplicated attachment of the cooling duct possible to a conveying device of a component which is coupled so to the machine and, for example, a transmission device.

In particular, the line element is of cylindrical configuration at least in sections. It is also possible, however, that the line element is of conical configuration at least in sections.

In particular, the line element runs in sections outside the rotor shaft and can be coupled there to the conveying device. In particular, the line element extends beyond an output-side shaft end of the rotor shaft.

In one advantageous refinement, the line element extends outside the cooling duct as far as at least one injection nozzle for the coolant. In particular, the line element is arranged in front of the injection nozzle in such a way that the line element at least partially and preferably completely forwards the coolant which is output from the injection nozzle. In particular, the line element is flow-connected via the injection nozzle to at least one conveying device for the coolant. This provides a supply of the cooling duct which can be implemented in a structurally particularly favorable manner. In addition, a particularly simple separation of the line element and the injection nozzle is possible, for example when the machine is to be decoupled from a transmission.

The line element is preferably arranged within the rotor shaft in front of the injection nozzle. In particular, the injection nozzle extends as far as into the rotor shaft. In particular, the injection nozzle is arranged outside the cooling duct. In particular; the line element and the injection nozzle lie opposite one another in a section of the rotor shaft, which section is arranged outside the cooling duct but inside the rotor shaft. In particular, the injection nozzle is arranged in a cylindrical recess and, for example, a bore of the rotor shaft. The line element and the injection nozzle can also be arranged so as to lie opposite one another outside the rotor shaft.

In a likewise advantageous refinement, the line element is configured so as to run conically at least in sections. Here, a diameter of the line element is configured so as to decrease in the direction of the injection nozzle. As a result, the coolant which is output by the injection nozzle can be introduced particularly satisfactorily into the line element and can be conducted further into the cooling duct. A diameter of the line element is configured, in particular, so as to increase in the direction of an outlet opening or orifice of the line element.

It is possible that at least one baffle body is arranged at an outlet opening or orifice of the line element in the interior of the cooling duct. For example, the baffle body is configured as a plug and/or a disk. At least one opening or orifice of the line element is preferably arranged radially with respect to the baffle body. In particular, a coolant jet is deflected at the orifice of the line element by way of the baffle body and is guided against a wall of the cooling duct. In particular, the exit of the coolant takes place at the orifice of the line element transversely with respect to the flow direction of the coolant within the line element. It is also possible, however, that the line element has at least one axial outlet. It is possible that the line element is axially open at its orifice.

In one advantageous development, the line element is provided by way of at least one insert part or comprises at least one insert part of this type. In particular, the insert part can be plugged with at least one end into the inlet. In particular, the insert part is supported by way of another end within the cooling duct. In order to plug it into the inlet, the insert part can have, for example, a circumferential ring and, in particular, an O-ring. In order to support it within the cooling duct, the insert part preferably has at least one radially arranged supporting collar. The supporting collar is adapted at least partially, in particular, to an internal diameter of the cooling duct. It is possible that the supporting collar is arranged on the baffle body. The supporting collar and the baffle body can also be configured in one piece.

The inlet of the cooling duct preferably comprises at least one inlet duct which runs axially in the rotor shaft. The inlet duct preferably opens on at least one axial end side of the rotor shaft. The inlet duct preferably opens on the axial end side of the rotor shaft into at least one conveying device, preferably of a transmission device.

It is also possible, however, that the inlet duct has a different profile and/or is arranged at a different position of the rotor shaft. For example, the inlet duct can run at least in sections radially in the rotor shaft and/or can open on a radial side of the rotor shaft.

The outlet of the cooling duct preferably comprises at least one outlet duct which runs at an angle with respect to the longitudinal axis of the rotor shaft. In particular, a radially running outlet duct is provided. Here, the longitudinal axis of the outlet duct is preferably inclined in an axial direction. At least two or three or else more outlet ducts of this type can be provided. In particular, a symmetrical arrangement of the outlet ducts is provided. In particular, the outlet duct opens into at least one storage vessel of a conveying device.

The outlet duct can also have a different profile and/or a different arrangement in the rotor shaft. For example, the outlet duct can run at least in sections axially in the rotor shaft and/or can open on an axial side of the rotor shaft.

In one particularly advantageous refinement, the inlet and the outlet are arranged coaxially with respect to one another. Here, in particular, the inlet is arranged so as to lie on the inside. Here, in particular, the outlet is arranged around the inlet. A reversed arrangement is also possible. In particular, at least one inlet duct and at least one outlet duct are also arranged coaxially with respect to one another. In particular, the inlet and the outlet are arranged coaxially with respect to one another on a common end section of the rotor shaft.

The machine particularly preferably comprises at least one transmission device. The transmission device comprises, in particular, at least one conveying device for a transmission oil. In particular, the conveying device is flow-connected to the cooling duct, with the result that the transmission oil can be used as coolant.

A refinement of this type makes particularly advantageous cooling of the machine possible, since complicated and expensive sealing which is afflicted by a high power loss can be dispensed with in the case of oil cooling. In addition, the machine according to aspects of the invention affords many advantages in the case of the use of transmission oil as coolant. Overheating of the oil is avoided reliably by way of the conical configuration of the cooling duct, with the result that the transmission oil provides reliable lubrication even over a long operational time period. It is also particularly advantageous that the electric machine has an independent conveying means of the transmission oil. As a result, the oil can be conveyed out of the rotor shaft and/or the cooling duct even when the conveying device of the transmission is temporarily inactive. The transmission oil in the interior of the rotor shaft is thus not heated unfavorably during a standstill of the transmission.

It is also particularly preferable that the machine comprises at least one control device. The control device is suitable and configured, in particular, for allowing the rotor shaft to continue to run at least temporarily when the machine is not required for a drive purpose. It is thus reliably avoided during a standstill of the transmission that the transmission oil is conveyed out of the rotor shaft and is not damaged by way of the high temperatures in the rotor shaft.

In particular, a duration of the running continuation is, dimensioned in such a way that a defined quantity of coolant is conveyed out of the cooling ducts. For example, at least that quantity of coolant which can be received into the cooling duct during proper operation is conveyed out. It is also possible that a multiple of the quantity which can be received is conveyed out of the cooling duct.

It is possible that at least one sensor detection means of the coolant temperature and/or the temperature of the rotor shaft is provided. In particular, the control device is then suitable and configured for controlling the running continuation in a manner which is dependent on the detected temperature. The control device is particularly preferably suitable and configured for switching the transmission device to idling at least during the running continuation. In particular, the control device is suitable and configured for detecting a standstill of the electric vehicle and thereupon allowing the rotor shaft to continue to run.

The electric vehicle according to aspects of the invention preferably comprises at least one electric machine according to aspects of the invention. The electric machine serves, in particular, as a traction drive of the electric vehicle. The electric vehicle is configured, in particular, as a motor vehicle and preferably as a passenger motor vehicle.

On account of the particularly advantageous cooling of the electric machine, the electric vehicle according to aspects of the invention can be equipped with a particularly powerful machine. In addition, the electric vehicle according to aspects of the invention has the advantage that cooling by way of transmission oil is possible, without disadvantageously shortened maintenance intervals with regard to the transmission oil occurring. It is a further advantage that the transmission can be additionally heated by way of the use of the transmission oil as coolant, which results in an advantageous influence on the degree of efficiency.

In particular, the electric vehicle comprises at least one control device. The control device is suitable and configured, in particular, for switching the transmission device to idling and for switching the rotor shaft to running continuation at a standstill of the electric vehicle.

The coolant is, in particular, oil and preferably transmission oil. Other coolants which are suitable for electric machines are also possible.

The cooling duct provides a conical or cone-shaped cavity at least in sections. The cooling duct has the shape of a cone or truncated cone at least in sections. The cooling duct comprises, in particular, at least one conically running duct inner side. In particular, the rotor shaft and the cooling duct are arranged coaxially with respect to one another.

The cooling duct has, in particular, a conicity at least in sections. The cooling duct has, in particular, a duct diameter or internal diameter which increases or decreases in the longitudinal direction or axial direction of the rotor shaft. The internal diameter of the cooling duct preferably increases in the direction of an outlet for the coolant and, in particular, increases continuously. In particular, the coolant is introduced into the cooling duct at one end of the cooling duct, at which end the internal diameter is smaller. The coolant is preferably discharged from the cooling duct at one end of the cooling duct, at which end the internal diameter is greater.

The electric machine is, in particular, an electric motor. The machine can also be a generator. The machine preferably comprises at, least one stator.

BRIEF DESCRIPTION OF THE DRAWINGS

Further advantages and features of the present invention result from the exemplary embodiment which will be described in the following text with reference to the appended figures, in which.

DETAILED DESCRIPTION OF THE INVENTION

Figure 1:
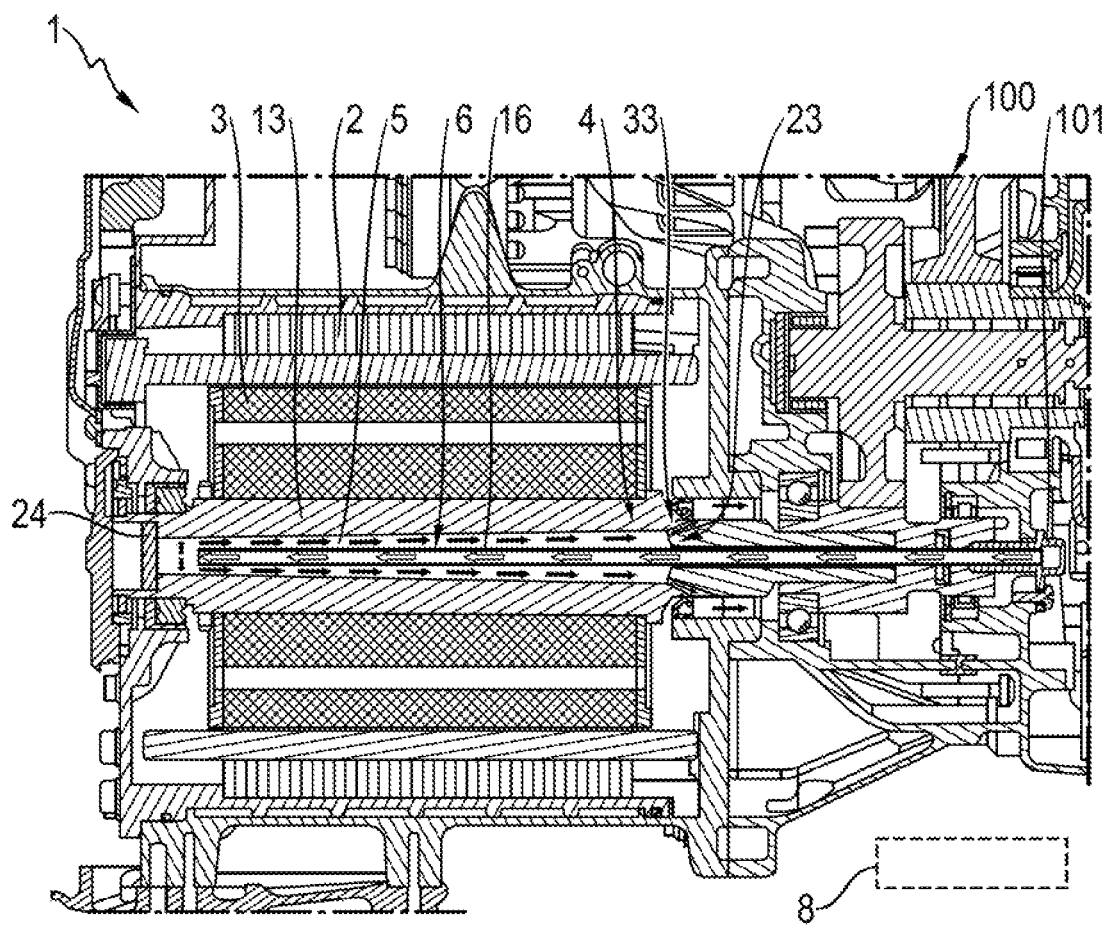
FIG. 1 shows a diagrammatic illustration of an electric machine according to aspects of the invention in a sectioned side view.
Figure 2:
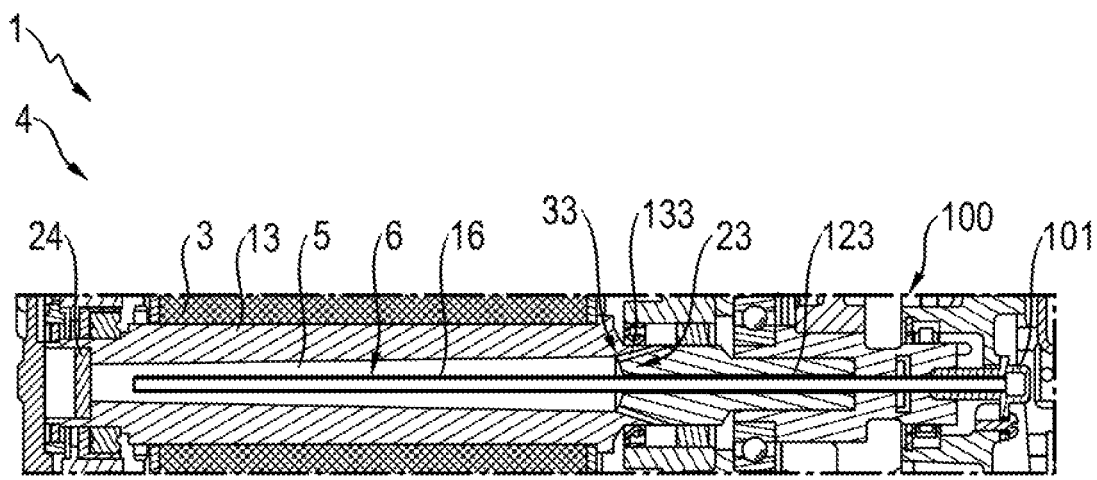
FIG. 2 shows a detailed view of a detail from FIG. 1.

FIG. 1 shows an electric machine 1 according to aspects of the invention having a transmission device 100 which is attached to it. FIG. 2 shows a detailed view of FIG. 1. The electric machine 1 can be used, for example, in an electric vehicle according to aspects of the invention for a traction drive.

Here, the electric machine 1 comprises a stator 2 and a rotor 3 which is received rotatably in the stator 2. Here, the rotor 3 comprises a rotatably mounted rotor shaft 13. Here, an end section of the rotor shaft 13 is mounted in a housing of the machine 1.

Here, another end section of the rotor shaft 13 protrudes out of the housing of the machine 1 and provides the output-side shaft end. Here, said end of the rotor shaft 13 is connected to the transmission device 100, with the result that the transmission device 100 can be driven by way of the machine 1.

Here, in order to discharge heat, a duct system 4 is provided which can be flowed through by a liquid coolant. Here, a transmission oil is provided as coolant. Here, the transmission oil comes from the transmission device 100 which is coupled to the machine 1.

The duct system 4 comprises a conically running cooling duct 5 which is arranged within the rotor shaft 13. Here, the cooling duct 5 is provided by way of a conical recess which is machined into the rotor shaft 13.

Here, the cooling duct 5 has a continuously increasing internal diameter. Here, the conical profile reaches a maximum diameter at that end of the rotor shaft 13 which is provided here as an output-side shaft end and is connected to the transmission device 100. The conical profile reaches its smallest internal diameter at the opposite shaft end.

During operation of the machine 1 and/or during a rotation of the rotor shaft 13, the coolant is conveyed along the duct inner side by way of the conical profile of the cooling duct 5. The rotor shaft 13 and/or the rotor 3 are/is cooled by way of the coolant which flows along the cooling duct 5.

Here, the conveying direction lies in the direction of the increase in the internal diameter of the cooling duct 5. The coolant is therefore conveyed in the direction of the output-side shaft end of the rotor shaft 13. Here, the flow direction of the coolant along the duct inner side is outlined by way of arrows. For improved clarity, the arrows are not illustrated in the detailed view which is shown in FIG. 2.

In order to move the transmission oil which serves as coolant out of the transmission device 100 into the cooling duct 5, the duct system 4 is flow-connected here to a conveying device 101 of the transmission device 100. Here, the conveying device 101 comprises a pump which pumps the transmission oil to the regions of the transmission 100 which are to be lubricated.

Here, the duct system 4 has a line element 6 which is flow-connected to the conveying device 101. The transmission oil is pumped by the conveying device 101 into the line element 6. Here, the oil flows along the flow direction which is indicated here by way of arrows through the line element 6 into the cooling duct 5.

Here, the line element 6 extends from the conveying device 101 via an inlet 23 into the cooling duct 5. The inlet 23 comprises an inlet duct 123 which runs axially in the rotor shaft 13. Here, the inlet duct 123 is configured as a cylindrical recess or bore within the output-side shaft end of the rotor shaft 13.

Here, the line element 6 extends beyond the inlet 23 into the cooling duct 5. Here, the line element 6 extends as far as an end of the cooling duct 5 which lies opposite the inlet 23. There, the line element 6 opens into the cooling duct 5, with the result that the coolant is released into the cooling duct 5.

From the orifice, the coolant is distributed to the inner side of the cooling duct 5. Here, the cooling duct 5 is at that end, at which the line element 6 opens, closed by way of a closure 24. By way of the rotational movement of the rotor shaft 13, the coolant is conveyed in the direction of the increasing internal diameter of the cooling duct 5. Here, the coolant is heated by way of the heat which is output by the rotor 3.

The cooling duct 5 has an outlet 33 at the output-side shaft end of the rotor shaft 13. Here, for example, the outlet 33 comprises two or else more outlet ducts 133. Here, the outlet ducts 133 are arranged radially and are inclined with their longitudinal axis in the axial direction here.

Here, the outlet ducts 133 exit from the rotor shaft 13 on a radial outer side. Here, the outlet ducts 133 open at a region of the rotor shaft 13 which is received in the transmission device 100. As a result, the oil which exits from the outlet ducts 133 is guided back into the transmission 100 again and, for example, into a storage vessel of the conveying device 101.

Here, the line element 6 is configured as a hollow lance 16. Here, the lance 16 provides a continuous flow connection from the conveying device 101 as far as its orifice at that duct end of the cooling duct 5 which lies opposite the inlet 23 or the outlet 33.

Figure 3:
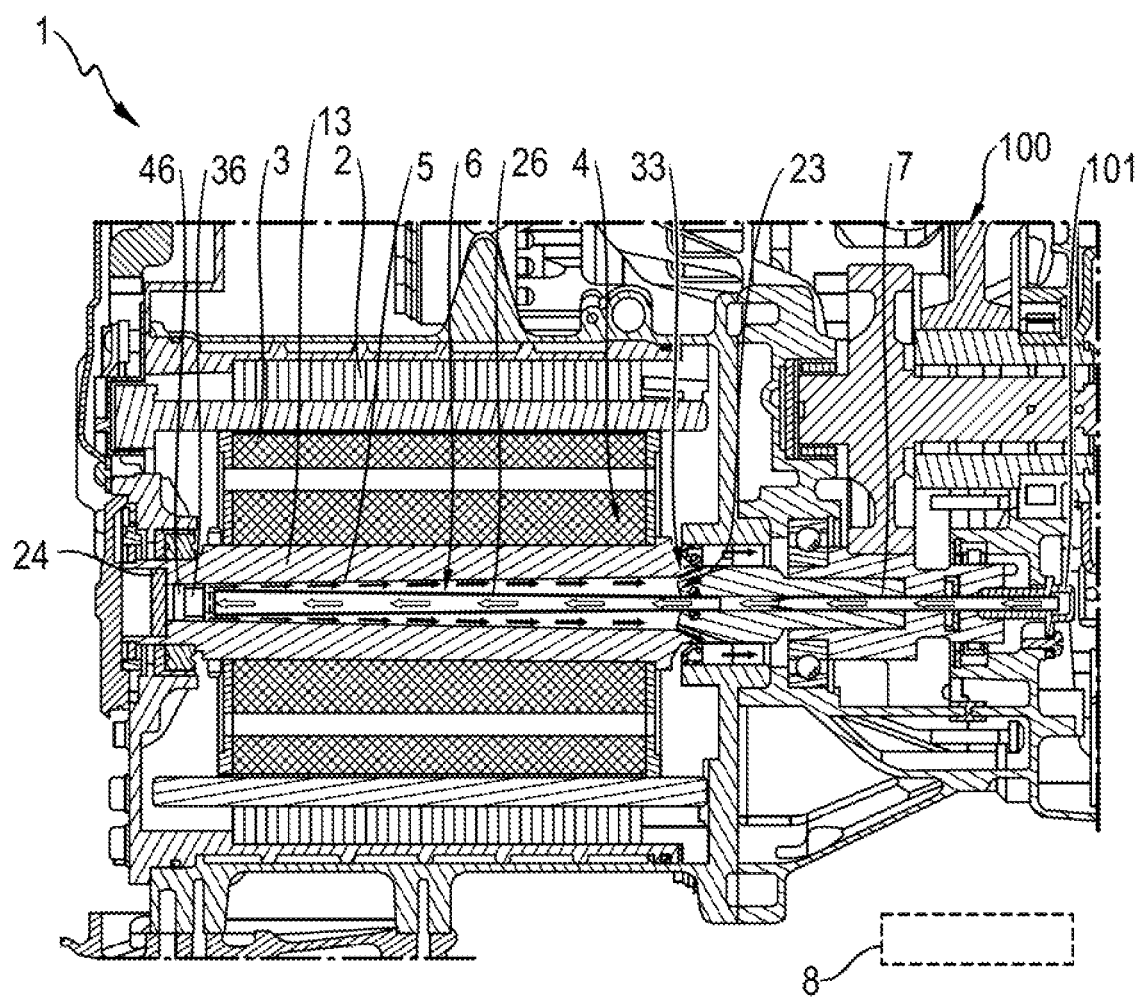
FIG. 3 shows a diagrammatic illustration of a further electric machine according to aspects of the invention in a sectioned side view.
Figure 4:
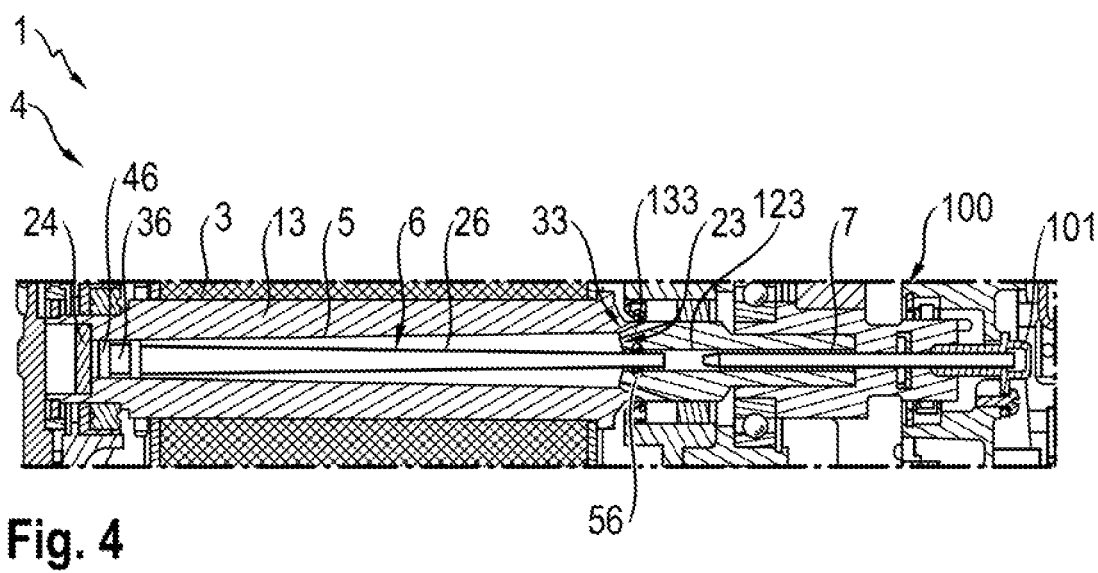
FIG. 4 shows a detailed view of a detail from FIG. 3.

FIG. 3 shows a further advantageous refinement of the machine 1 according to aspects of the invention. Here, FIG. 4 shows a detailed view of the machine 1 from FIG. 3.

Here, the feed of the transmission oil into the rotor shaft 13 takes place via an injection nozzle 7. Here, the injection nozzle is flow-connected to the conveying device 101 of the transmission device 100. Here, the injection nozzle 7 ends within the inlet duct 123 in the rotor shaft 13.

Here, in addition a line element 6 is arranged in the inlet duct 123. Here, the nozzle 7 and the line element 6 are arranged in the inlet duct 123 so as to lie opposite one another in such a way that the coolant which is output by the nozzle 7 can be injected into the line element 6 in a targeted manner. Here, the arrows within the nozzle 7 and the line element 7 indicate the flow direction of the coolant.

Here, the line element 6 extends from the inlet duct 123 into the cooling duct 5 and runs through the latter as far as an end of the coding duct 5 which lies opposite the inlet 23. There, the line element 6 opens into the cooling duct 5.

Here, a baffle body 36 is arranged at the orifice of the line element 6, with the result that the coolant which flows through the line element 6 is deflected. Here, the coolant exits from the line element 6 via radially arranged outlet openings. From there, the coolant is conveyed along the inner wall of the cooling duct 5 back to the outlet 33. The conveying direction along the duct wall is indicated here by way of arrows.

Here, the line element 6 is configured as an insert part 26. The insert part 26 is manufactured, for example, from a plastic material. Here, the insert part 26 is plugged with one end into the inlet duct 123. In order to ensure reliable and sealed bearing of the insert part 26, an O-ring 56 is arranged here between the insert part 26 and the inlet duct 123.

Here, the insert part 26 has the baffle body 36 and the outlet opening for the coolant at the opposite end. In addition, al supporting collar 46 is arranged at said end, by way of which supporting collar 46 the insert part 2 is supported in the cooling duct 5.

In one advantageous refinement, the machine 1 according to aspects of the invention comprises a control device 8 which controls a running continuation of the machine 1. During the running continuation, the coolant which remains in the rotor shaft 13 or in the cooling duct 5 is conveyed in the direction of the outlet 33. Overheating of the transmission which is used as coolant is thus avoided reliably.

For example, the control device 8 switches the transmission, device 100 to idling as soon as the electric vehicle which is driven by way of it comes to a standstill. In addition, the control device 8 allows the machine 1 to continue to run correspondingly. Thus, the transmission oil is pumped out by the rotating rotor shaft 13 by way of the conical profile of the cooling duct 5. Overheating of the oil which remains in the rotor shaft 13 can thus be avoided effectively.

The electric machine 1 which is proposed here is configured as an electric drive machine or as an electric motor. The electric machine 1 can also be configured as a generator, however.

What claimed is:

1. An electric machine for an electric vehicle, having:
   at least one rotor which can be rotated with respect to at least one stator and has at least one rotor shaft;
   at least one duct system for cooling the electric machine, through which a coolant flows, the duct system running at least in sections within the at least one rotor shaft;
   wherein:
      the duct system comprises at least one cooling duct, and
      the cooling duct is configured so as to run conically at least in sections in a longitudinal direction of the at least one rotor shaft such that the coolant is conveyed in the longitudinal direction of an increasing duct diameter by way of a rotational movement of the at least one rotor shaft;
   at least one outlet for discharging the coolant from the cooling duct, the at least one outlet flow-connected to an oil space of a transmission coupled to the electric machine;
   a temperature sensor to detect a rotor shaft temperature of the at least one rotor shaft or a coolant temperature of the coolant; and
   a control device to:
      when the electric vehicle comes to a standstill, switch the transmission coupled to the electric machine to idle, and
      when the detected rotor shaft temperature or the coolant temperature exceed a maximum permissible heating threshold, control a running continuation of the electric machine such that the coolant in the at least one rotor shaft or in the cooling duct is pumped to the at least one outlet and out of the at least one the rotor shaft and the cooling duct.

2. The electric machine as claimed in claim 1, the cooling duct being configured as at least one recess which is machined into the rotor shaft.

3. The electric machine as claimed in claim 1, the rotor shaft comprising at least one inlet for introducing the coolant into the cooling duct and the inlet and the at least one outlet being arranged on a common end section of the rotor shaft.

4. The electric machine as claimed in claim 3, the inlet being connected to at least one line element, and the line element running at least in sections within the cooling duct and opening into the cooling duct at a duct end which lies opposite the inlet.

5. The electric machine as claimed in claim 4, the line element running outside the cooling duct in sections, and the line element is coupled to at least one conveying device for the coolant.

6. The electric machine as claimed in claim 4, the line element extending outside the cooling duct as far as at least one injection nozzle for the coolant, and the line element being arranged in front of the injection nozzle in such a way that the line element at least partially forwards the coolant which is output from the injection nozzle.

7. The electric machine as claimed in claim 6, the line element being configured so as to run conically at least in sections, and a diameter of the line element being of decreasing configuration in the direction of the injection nozzle.

8. The electric machine as claimed in claim 4, the line element being provided by at least one insert part, and the insert part is plugged with one end into the inlet, and the insert part being supported by way of another end within the cooling duct.

9. The electric machine as claimed in claim 3, the inlet comprising at least one inlet duct which runs axially in the rotor shaft and opens on at least one axial end side of the rotor shaft.

10. The electric machine as claimed in claim 3, the outlet comprising at least one outlet duct which runs at an angle with respect to the longitudinal axis of the rotor shaft.

11. The electric machine as claimed in claim 3, the inlet and the at least one outlet being arranged coaxially with respect to one another.

12. The electric machine as claimed in claim 1, comprising at least one transmission device with at least one conveying device for a transmission oil, the conveying device being flow-connected to the cooling duct, and the transmission oil is can be used as the coolant.

13. An electric vehicle, comprising at least one electric machine as claimed in claim 1.

* * * * *